United States Patent [19]
Bushman

[11] Patent Number: 5,492,010
[45] Date of Patent: Feb. 20, 1996

[54] POSITION IDENTIFICATION DEVICE USING AN ACCELEROMETER

[75] Inventor: Boyd B. Bushman, Lewisville, Tex.

[73] Assignee: Lockheed Corporation, Fort Worth, Tex.

[21] Appl. No.: 350,797

[22] Filed: Dec. 7, 1994

[51] Int. Cl.$^6$ .................................................... G01P 15/08
[52] U.S. Cl. ......................................... 73/514.25; 73/503
[58] Field of Search ........................... 73/514.25, 514.19, 73/514.09, 504.01, 514.03, 490, 493, 503, 178 R

[56] References Cited

U.S. PATENT DOCUMENTS

| | | | |
|---|---|---|---|
| 3,110,185 | 11/1963 | Hughes | 73/514.25 |
| 3,309,930 | 3/1967 | Jones | 73/514.25 |

*Primary Examiner*—John E. Chapman
*Attorney, Agent, or Firm*—James E. Bradley

[57] ABSTRACT

A device for determining position uses three voltage dividers. Each voltage divider is a metal conductor having a head on one end and two legs on an opposite end. The tips of the legs of each of the bodies are located in planes which are perpendicular to the other bodies. A DC voltage is applied to the head of each of the bodies to create first and second electron flow paths. The voltage across each flow path is monitored. A difference in voltage of flow path relative to the other indicates a change in velocity in a direction wherein one leg leads the other leg. The voltage change correlates to acceleration. By timing the duration, velocity and distance travelled are computed. When mounted aboard a plane, vehicle, ship or spacecraft the unit displays a continous "present location".

16 Claims, 3 Drawing Sheets

POSITION IDENTIFICATION DEVICE USING AN ACCELEROMETER

BACKGROUND OF THE INVENTION

1. Field of the Invention

This invention relates in general to devices which provide location identification and in particular to a device which senses acceleration to determine position.

2. Description of the Prior Art

A number of devices have been employed in the past for determining the position of moving bodies on earth, such as on ships, aircraft, and road vehicles. One method in the past has been with celestial navigation techniques. However, celestial navigation is not sufficiently fast and accurate for military needs. Loran navigation is employed, using radio waves and triangularization. However, loran may not be feasible for determining position during war, and radio transmitters can be destroyed. Global positioning systems rely on satellites. Satellites can be destroyed being war time.

Accelerometers of various types have been employed in the past to determine the amount of acceleration of various vehicles. However, accelerometers have not been employed for positioning.

SUMMARY OF THE INVENTION

In this invention, a device is provided that will sense acceleration and deceleration. The apparatus has at least one metal body of electrically conductive material. The body has a head on one end and first and second legs on an opposite end. The head and legs are in electrical continuity with each other. The legs have tips which are spaced apart from each other by a gap.

A DC voltage source supplies a DC potential to the body to create a flow of electrons between the head and each of the tips. A measuring device measures whether there is any voltage differential between the head and the tips of the spaced apart legs. It has been found that when the body is accelerated in a direction which places one of the legs leading the other, the measuring device will detect a change in the voltage from what existed while the body was stationary. In this manner, acceleration and deceleration can be indicated. The voltage change is proportional to the amount of acceleration.

To determine the position, three of the bodies are provided, each oriented perpendicular to the others. One will sense acceleration and deceleration in an X-plane, the other in a Y-plane, and the third in a Z-plane. Through calibration, the voltage change measured will be converted to acceleration. Acceleration is adjusted for the gravity at the particular point where the bodies are located. A timer measures the duration of the acceleration or deceleration. From that, the velocity may be computed by multiplying the time with acceleration. The distance traveled is computed by multiplying the velocity with the time duration of the velocity. The velocity and distance travelled of each of the bodies are then correlated to determine the vector. By calibration to a first reference point relative to Earth, the position can be calculated and displayed on the aircraft, vehicle, ship or spacecraft on which the device is mounted.

DETAILED DESCRIPTION OF THE INVENTION

Figure 1:
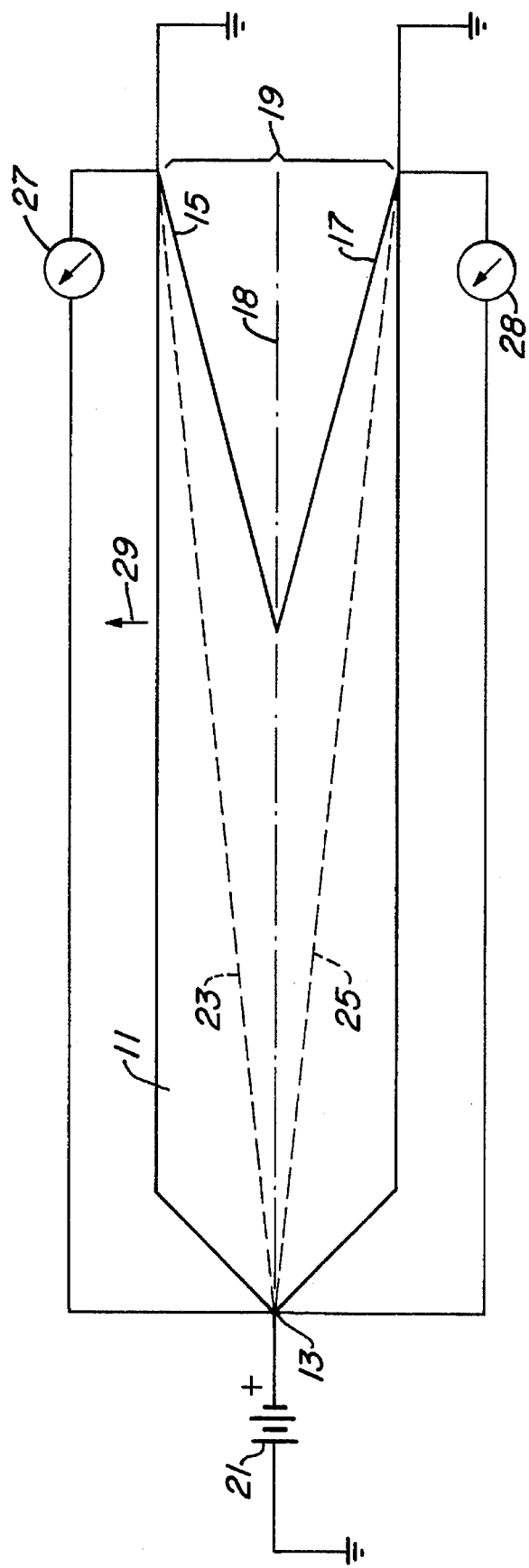
FIG. 1 is a side view illustrating a body for use in a positioning determining device in accordance with this invention.

Referring to FIG. 1, a body 11 is shown, which is referred to herein as the X-direction body. Body 11 is a solid metal member of electrically conductive material, such as brass. In the embodiment shown, body 11 is a cylindrical rod having a head 13 on one end and two legs 15, 17 on the other end so as to operate as a voltage divider. A longitudinal axis 18 extends through body 11. Legs 15, 17 are located equidistant from axis 18. A V-shaped gap 19 separates the legs 15, 17. Gap 19 diverges outward toward the tips of the legs 15, 17 and is triangular in configuration, with straight sides. In the embodiment shown, legs 15, 17 are roughly about half the overall length of body 11.

A DC power source or battery 21 has its negative terminal connected to ground and its positive terminal connected to head 13. Connecting the tips of legs 15, 17 to ground will cause a current flow of electrons, as illustrated by the numerals 23, 25. Electron path 23 flows in a straight line between head 13 and the tip of leg 15, while electron path 25 flows in a straight line between head 15 and the tip of leg 17.

The magnitudes of the electron paths 23, 25 are sensed and subtracted from one another. In the preferred embodiment, a sensitive voltmeter 27 will measure the voltage between head 13 and at the tip of leg 15 over electron path 23. A sensitive voltmeter 28 will measure the voltage between head 13 and the tip of leg 17 over electron path 25. Because the body 11 is a uniform conductor and the paths 23, 25 are the same lengths, voltages 27, 28 should be the same while body 11 is stationary. Even if there is a slight difference due to manufacturing variations, the difference in voltage between the voltmeters 27, 28 will be constant as long as body 11 is stationary.

It has been found that accelerating the body 11 in the direction indicated by the arrow 29 will cause a change to occur in the voltage differential between the voltmeters 27, 28. The masses of the electrons in the electron paths 23, 25 react to the acceleration by flowing into the direction 29 of the acceleration. Direction 29 is in a plane that contains the tips of the legs 15, 17. Direction 29 is transverse to the longitudinal axis 18, and shown in the drawing to be perpendicular. In this plane, referred to as the X-plane, leg 15 will be leading leg 17 when the acceleration is in the direction of arrow 29. Because more of the electrons move into the direction of acceleration than away from it, a change occurs in the electron paths 23, 25. The voltage of flow path 23 as measured by voltmeter 27 decreases slightly, while the voltage measured by voltmeter 28 increases slightly. This results in a change which is proportional to the magnitude and direction of the acceleration.

The voltage differential can be calibrated using known accelerations of different magnitudes. In this manner, measuring a voltage and applying it to the algorithm derived from testing enables one to determine the acceleration merely by measuring the change in voltage differential between the head 15 and the tips of legs 15, 17. Preliminary testing has indicated that the proportionality between the voltage and acceleration is linear. In one test, the body 11 was approximately six inches long, one inch in diameter, and made of solid brass. Applying a known one g acceleration in direction 29 resulted in a voltage differential change between voltmeters 27, 28 of about 3%.

Figure 2:
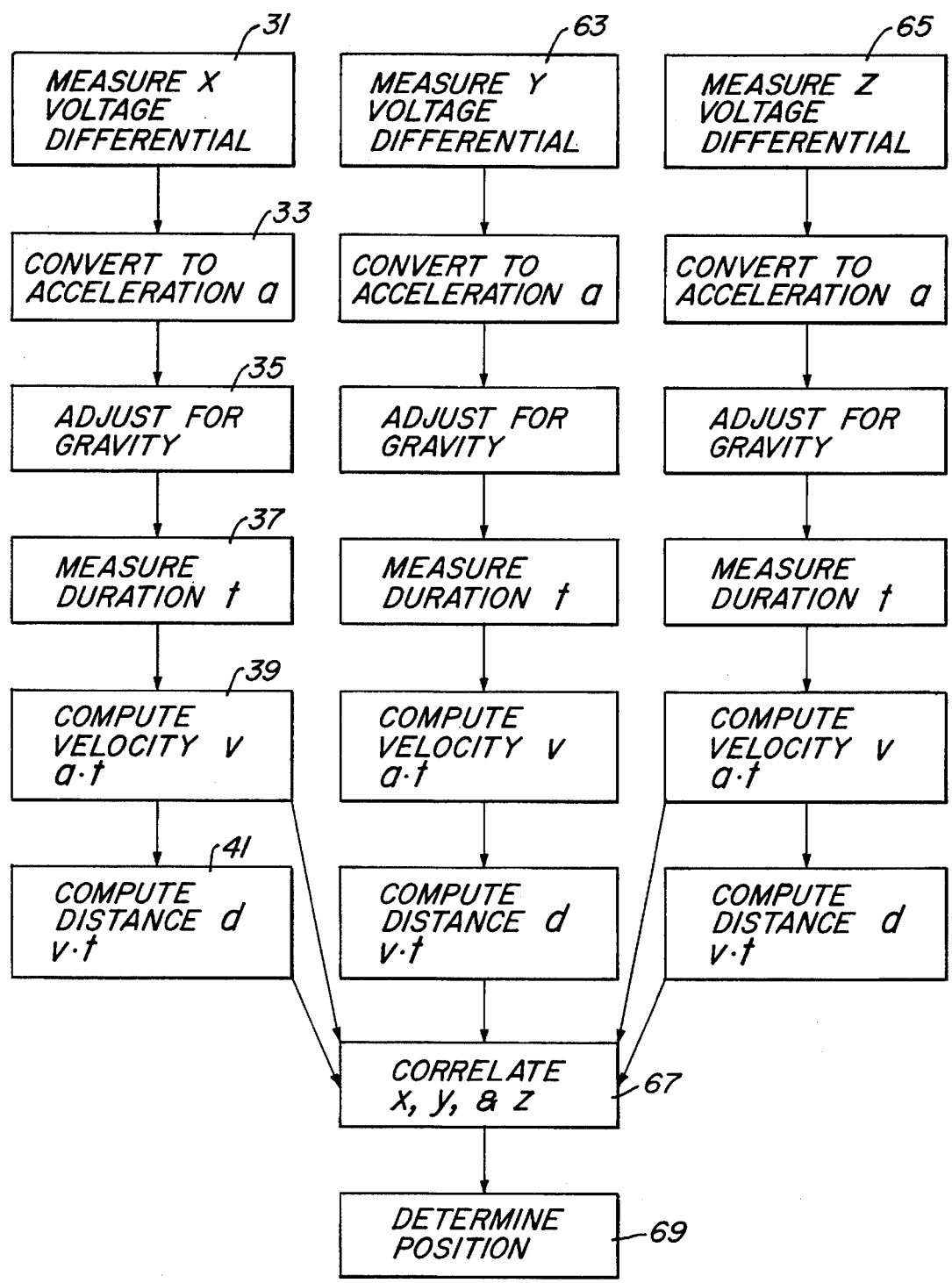
FIG. 2 is a flow chart illustrating the method of utilizing the body of FIG. 1.

Referring to FIG. 2, the process for using the measured voltage differential to determine position is shown. In step 31, the voltages between head 13 and the tips of legs 15, 17 are measured and subtracted from one another to arrive at a voltage differential. While body 11 is stationary, the differential should be zero, and while accelerating or decelerating, it will have a magnitude proportional to the acceleration or deceleration. As indicated by step 33, this voltage differential is converted to acceleration. The conversion to acceleration is performed by utilizing an algorithm derived by previous testing. In the testing, the body 11 is subjected to known accelerations of different magnitudes, with the voltages being plotted for each different acceleration.

In step 35, an adjustment is made for gravity to determine true acceleration. Gravity and the earth's centripetal forces are vectorally subtracted from the acceleration measured. The gravity and centripetal forces are taken from available known data characteristic of the earth's surface, depending on the latitude. As shown by step 37, the duration of the voltage differential is measured. The duration then is used to compute velocity by multiplying the acceleration times the duration. The distance travelled is computed by multiplying the velocity times the duration, as indicated by step 41. If the body 11 is moving in only the X-plane and perpendicular to longitudinal axis 18 as indicated by the arrow 29, then its distance travelled from when acceleration began can be computed. Deceleration is computed in the same manner.

Processing the steps 31, 33, 35, 37, 39 and 41 every few milliseconds enables the precise distance travelled to be continuously ascertained. If the longitude and latitude of the initial position are known, the position of the body 11 will be known at all times.

Figure 3:
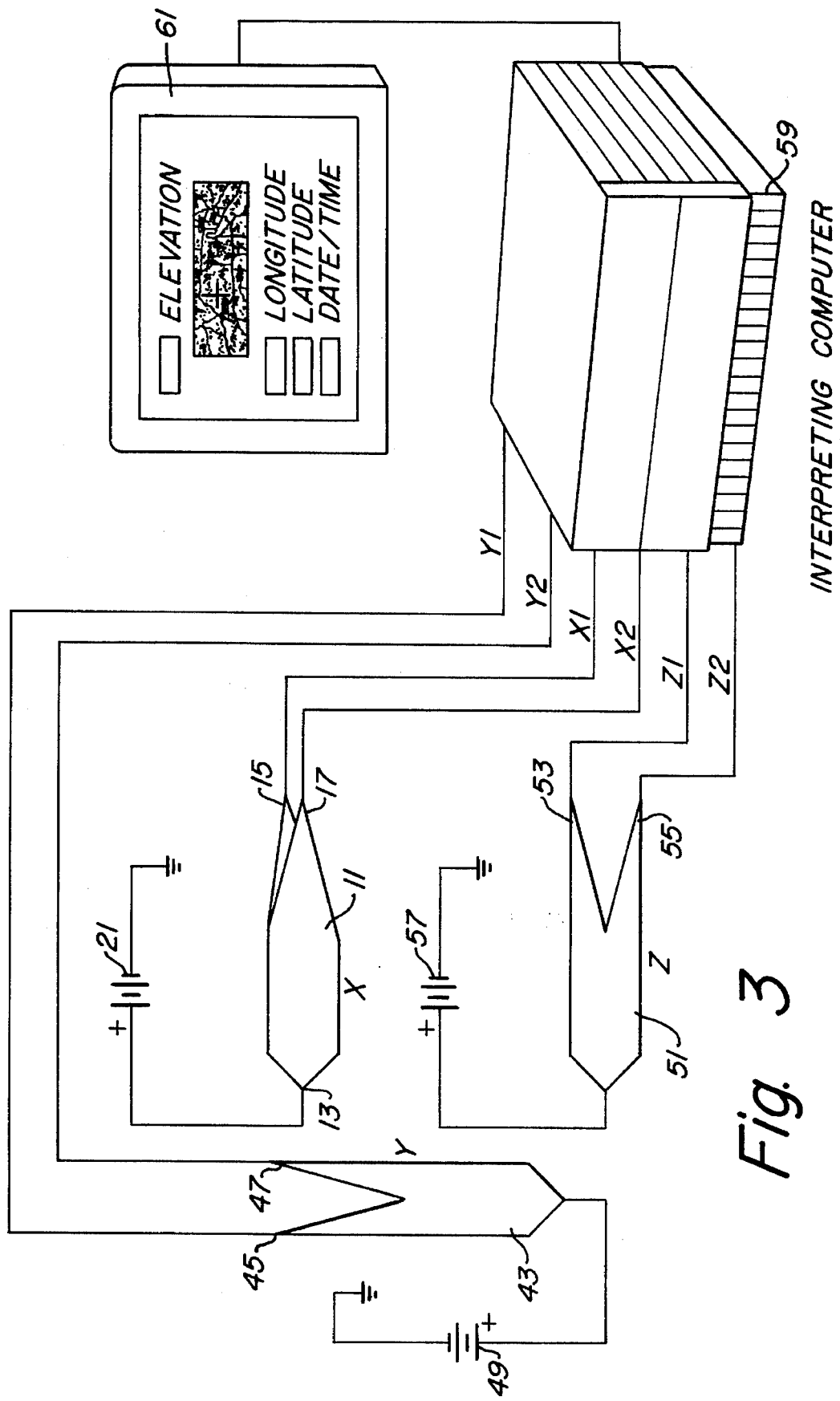
FIG. 3 is a schematic view illustrating a positional device in accordance with this invention, which includes three of the bodies as shown in FIG. 1.

Referring now to FIG. 3, a schematic illustrating an apparatus for measuring travel in three dimensions is illustrated. X-direction body 11 is shown oriented with its legs 15 in an X-plane, which is an arbitrarily chosen plane, such as horizontal. Y-direction body 43 is identical to X-direction body 11, however, its legs 45, 47 oriented so that the tips are in a Y-plane. Y-plane is perpendicular to the X-plane, such as in a vertical direction. Y-direction body 43 is connected to a DC power source 49 in a similar manner to X-direction body 11. A Z-direction body 51 is mounted in the apparatus with its legs 53, 55 in the Z-plane, which may be a depth plane. Z-direction body 51 is connected to a DC power source 57. Z-plane is perpendicular to both the X-plane and the Y-plane.

In this manner, regardless of the direction and movement of the apparatus, one of the legs 15, 17 or 45, 57 or 53, 55 will lead the other of its legs so as to sense change in velocity. Typically, the vehicle, such as an airplane, containing the device will move so that there will be some acceleration in more than one plane, therefore there will be voltage differentials changing due to acceleration by at least two and frequently all three of the bodies 11, 43, and 51.

The legs 15, 17, 45, 47 and 53, 55 are connected to an interpreting computer 59 which processes the information generally as shown in FIG. 2. Computer 59 will display the elevation and the longitude and latitude at all times. Referring again to FIG. 2, a series of steps 63 for the Y-direction body 43 will be computed in an identical manner to the steps 31, 33, 35, 37, 39 and 41. Similarly, a series of steps 65 for the Z-direction body 51 will be performed in the same manner as the steps 63. The velocity and distance computations pass to a correlation step 67 which correlates the amount of acceleration occurring in the X, Y and Z planes. This correlation allows a precise position to be determined as indicated by step 69.

The invention has significant advantages. The bodies sense small changes in velocity. The device computes position upon the earth's surface without relying on radio wave signals or satellites. Nor does it require the use of a gyro compass or celestial navigational procedures.

While the invention has been shown in only one of its forms, it should be apparent to those skilled in the art that it is not so limited, but is susceptible to various changes without departing from the scope of the invention.

I claim:

1. An apparatus which senses acceleration, comprising:

at least one body of electrically conductive material, having a head on one end and first and second legs on an opposite end, the head and first and second legs being in electrical continuity with each other, the first and second legs having tips which are spaced apart from each other;

means for causing a direct current to flow through the body between the head and the tip of the first leg to create a first electron flow path, and between the head and the tip of the second leg to create a second electron flow path;

measuring means for measuring the magnitudes of the first and second electron flow paths and determining any difference between said magnitudes; and wherein while the body is accelerating in a direction wherein one of the legs leads the other, the measuring means will detect a difference in said magnitudes which is proportional to said acceleration.

2. The apparatus according to claim 1, wherein the body has a longitudinal axis, and the tips of the legs are spaced apart from each other on opposite sides of the longitudinal axis.

3. The apparatus according to claim 1, wherein the legs are separated from each other by a V-shaped gap.

4. The apparatus according to claim 1, further comprising:

timing means for timing the duration of the difference in said magnitudes so as to indicate distance travelled of the body.

5. The apparatus according to claim 1, wherein:

there are three of the bodies, one oriented with the tips of its legs in an X-direction plane, one oriented with the tips of its legs in a Y-direction plane, and one oriented with the tips of its legs in a Z-direction plane, the X-direction, Y-direction, and Z-direction planes being perpendicular to each other; and the measuring means measures the magnitudes of the first and second electron flow paths and determines any difference between said magnitudes of each of the bodies to determine a direction of acceleration of the bodies.

6. The apparatus according to claim 1, wherein:

there are three of the bodies, one oriented with the tips of its legs in an X-direction plane, one oriented with the tips of its legs in a Y-direction plane, and one oriented with the tips of its legs in a Z-direction plane, the X-direction, Y-direction, and Z-direction planes being perpendicular to each other; and the measuring means measures the magnitudes of the first and second electron flow paths and determines any difference between said magnitudes of each of the bodies to determine a direction of acceleration of the bodies; and wherein the apparatus further comprises:

timing means for timing the duration of the differences in said magnitudes of each of the bodies so as to indicate distance travelled of the body and therefore a location of the bodies.

7. An apparatus which senses acceleration and deceleration, comprising:

at least one body of electrically conductive material, having a head on one end and first and second legs on an opposite end, the head and first and second legs being in electrical continuity with each other, the first and second legs having tips which are spaced apart from each other by a gap;

voltage means for applying a DC potential difference between the head and the tip of the first leg to create a first voltage and between the head and the tip of the second leg to create a second voltage; and measuring means for determining whether the first and second voltages change relative to each other, indicating that the body is accelerating or decelerating.

8. The apparatus according to claim 7, wherein:

the voltage means creates a first electron flow path between the head and the tip of the first leg and a second electron flow path between the head and the tip of the second leg; and acceleration in the direction of the first leg relative to the second leg causes a change in the first and second electron flow paths such that the change in the first and second voltages is proportional to the amount and direction of the acceleration.

9. The apparatus according to claim 7, wherein the legs are separated from each other by a V-shaped clearance.

10. The apparatus according to claim 7, further comprising:

timing means for timing the duration of the voltage changes occurring while under acceleration so as to indicate distance travelled of the body.

11. An apparatus for determining position, comprising:

X-direction, Y-direction, and Z-direction metal bodies, each of the bodies having a head on one end and first and second legs on an opposite end, each of the legs of each of the bodies terminating in a tip which is spaced from the tip of the other leg of the same body by a diverging gap, the bodies being fixedly mounted relative to each other with the gap of the X-direction body being in an X-direction plane, the gap of the Y-direction body being in a Y-direction plane, and the gap of the Z-direction body being in a Z-direction plane, wherein the X-direction plane, Y-direction plane, and Z-direction planes are perpendicular to each other;

means for applying to each of the bodies a DC potential difference between the head and the tip of the first leg to create a first voltage, and between the head and the tip of the second leg to create a second voltage; and measuring means for determining whether the first and second voltages of each of the bodies change relative to each other; wherein
  a voltage change of the X-direction body indicates a change in velocity of the body in the X-direction plane;
  a voltage change of the Y-direction body indicates a change in velocity of the body in the Y-direction plane;
  a voltage change of the Z-direction body indicates a change in velocity of the body in the Z-direction plane; and
  means for computing from the voltage changes the relative velocity of the apparatus, and for timing the voltage changes to determine the change in relative position of the apparatus.

12. The apparatus according to claim 11, wherein each of the bodies has a longitudinal axis, and the legs of each of the bodies are equidistant from the longitudinal axis.

13. The apparatus according to claim 11, wherein the gap between the legs of each of the bodies is V-shaped.

14. A method for indicating a change in velocity, comprising:

providing at least one body of electrically conductive material, having a head on one end and first and second legs on an opposite end, the head and first and second legs being in electrical continuity with each other, the first and second legs having tips which are spaced apart from each other;

causing a direct current to flow through the body between the head and each of the tips to create a first electron flow path from the head to the tip of the first leg and a second electron flow path from the head to the tip of the second leg;

measuring a magnitude of the first and second electron flow paths and determining whether a difference exists in the magnitudes of the first and second flow paths;

moving the body in a direction so that one of the legs leads the other of the legs; and determining whether said difference changes while the body is moving, indicating a change in velocity.

15. The method according to claim 14, further comprising:

timing the duration of any of the changes in velocity, and computing therefrom the distance travelled.

16. A method for determining position, comprising:

providing X-direction, Y-direction, and Z-direction metal bodies, each of the bodies having a head on one end and first and second legs on an opposite end, each of the legs of each of the bodies terminating in a tip which is spaced from the tip of the other leg of the same body by a gap;

mounting the bodies relative to each other with the gap of the X-direction body being in an X-direction plane, the gap of the Y-direction body being in a Y-direction plane, and the gap of the Z-direction body being in a Z-direction plane, wherein the X-direction plane, Y-direction plane, and Z-direction planes are perpendicular to each other;

applying to each of the bodies a DC potential difference between the head and the tip of the first leg to create a first voltage and between the head and the tip of the second leg to create a second voltage; and determining whether the first and second voltages of each of the bodies change relative to each other; wherein
  a voltage change of the X-direction body indicates a change in velocity of the body in the X-direction plane;
  a voltage change of the Y-direction body indicates a change in velocity of the body in the Y-direction plane;
  a voltage change of the Z-direction body indicates a change in velocity of the body in the Z-direction plane; and
  computing from the voltage changes the relative velocity of the apparatus, and for timing the voltage changes to determine the change in relative position of the bodies.

\* \* \* \* \*